(12) United States Patent
Hennings

(10) Patent No.: US 8,751,076 B2
(45) Date of Patent: Jun. 10, 2014

(54) COUPLED AXLE DRIVE SYSTEM FOR A VEHICLE

(75) Inventor: Stephan Hennings, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 520 days.

(21) Appl. No.: 13/017,106

(22) Filed: Jan. 31, 2011

(65) Prior Publication Data

US 2011/0196556 A1 Aug. 11, 2011

(30) Foreign Application Priority Data

Feb. 5, 2010 (DE) .......................... 10 2010 007 640

(51) Int. Cl.
*B60W 10/00* (2006.01)
*B60L 11/00* (2006.01)

(52) U.S. Cl.
USPC ........................................ 701/22; 180/65.265

(58) Field of Classification Search
USPC ............... 701/22; 180/65.265, 65.285, 65.21; 903/915, 946
See application file for complete search history.

(56) References Cited

U.S. PATENT DOCUMENTS

| | | | |
|---|---|---|---|
| 2007/0010933 A1 | 1/2007 | Hochkirchen | |
| 2007/0294026 A1* | 12/2007 | Schirmer | 701/202 |
| 2008/0039281 A1 | 2/2008 | Okuda | |
| 2009/0032321 A1 | 2/2009 | Marsh | |
| 2009/0242289 A1* | 10/2009 | Murty | 180/65.265 |
| 2010/0002513 A1 | 1/2010 | Lutze | |
| 2010/0025126 A1 | 2/2010 | Nakatsu et al. | |

OTHER PUBLICATIONS

Frank W Murphy Ltd.: Controls & Instrumentation. Condensed catalogue, revision C, May 2009. Salisbury, UK—Firmenschrift S .3, "Powerview PV101".

The Powerview 101 display. Product presentation, Frank W Murphy Ltd., 2009. URL: http://www.fwmurphy.com/uploaded/documents/pdfs/0810293.pdf (abgerufen am Mar. 29, 2011) S.2,7.

Schröder, C: Mercedes-Benz macht die S-Klasse zum Dreiliter—Auto. ATZ-online,Sep. 2009.URL:http://www.attzonline.de/index.php? do=show&alloc=1&id=10441 (abgerufen am Mar. 29, 2011) Abs.4.

* cited by examiner

*Primary Examiner* — Muhammad Shafi
(74) *Attorney, Agent, or Firm* — Gerald E. Hespos; Michael J. Porco; Matthew T. Hespos

(57) ABSTRACT

A coupled axle drive system for a vehicle has a first axle drive device for driving a first axle of the vehicle by a connected engine and a second axle drive device for driving a second axle of the vehicle. The second axle drive device has an electric machine for driving at least one wheel of the axle.

15 Claims, 6 Drawing Sheets

COUPLED AXLE DRIVE SYSTEM FOR A VEHICLE

CROSS-REFERENCE TO RELATED APPLICATION

This application claims priority under 35 USC 119 to German Patent Application No. 10 2010 007 640.6, filed on Feb. 5, 2010, the entire disclosure of which is incorporated herein by reference.

BACKGROUND OF THE INVENTION

1. Field of the Invention

The invention relates to a coupled axle drive system for a vehicle, e.g. a motor vehicle, which drives two different vehicle axles and the vehicle wheels connected thereto by a first and a second axle drive system.

2. Description of the Related Art

Vehicles fit either with a two-wheel drive or a four-wheel drive to drive one or both axles of the vehicle are known from the prior art. The respective axle or axles typically are driven by an internal combustion engine.

It is the object of the invention to provide an improved drive system for a vehicle and to provide a vehicle with such an improved drive system and a method for controlling the drive system.

SUMMARY OF THE INVENTION

The invention provides a coupled axle drive system for a vehicle with first and second axle drive devices. The first axle drive device drives a first axle of the vehicle by a connected engine. The second axle drive device has an electric machine for driving at least one wheel of the second axle.

The coupled axle drive system has the advantage that one axle of the vehicle can be driven by a conventional drive device using an engine and that the second axle can be driven when required using the second, electric axle drive device with the electric machine. In this way, the coupled drive system achieves two-wheel drive and, when required, four-wheel drive with different drives for different axles.

The invention is explained in greater detail below by means of the illustrative embodiments shown in the schematic figures of the drawings.

DETAILED DESCRIPTION OF THE PREFERRED EMBODIMENTS

Elements and devices in the figures that are the same or have the same function have been provided with the same reference signs, unless indicated otherwise.

Figure 1:
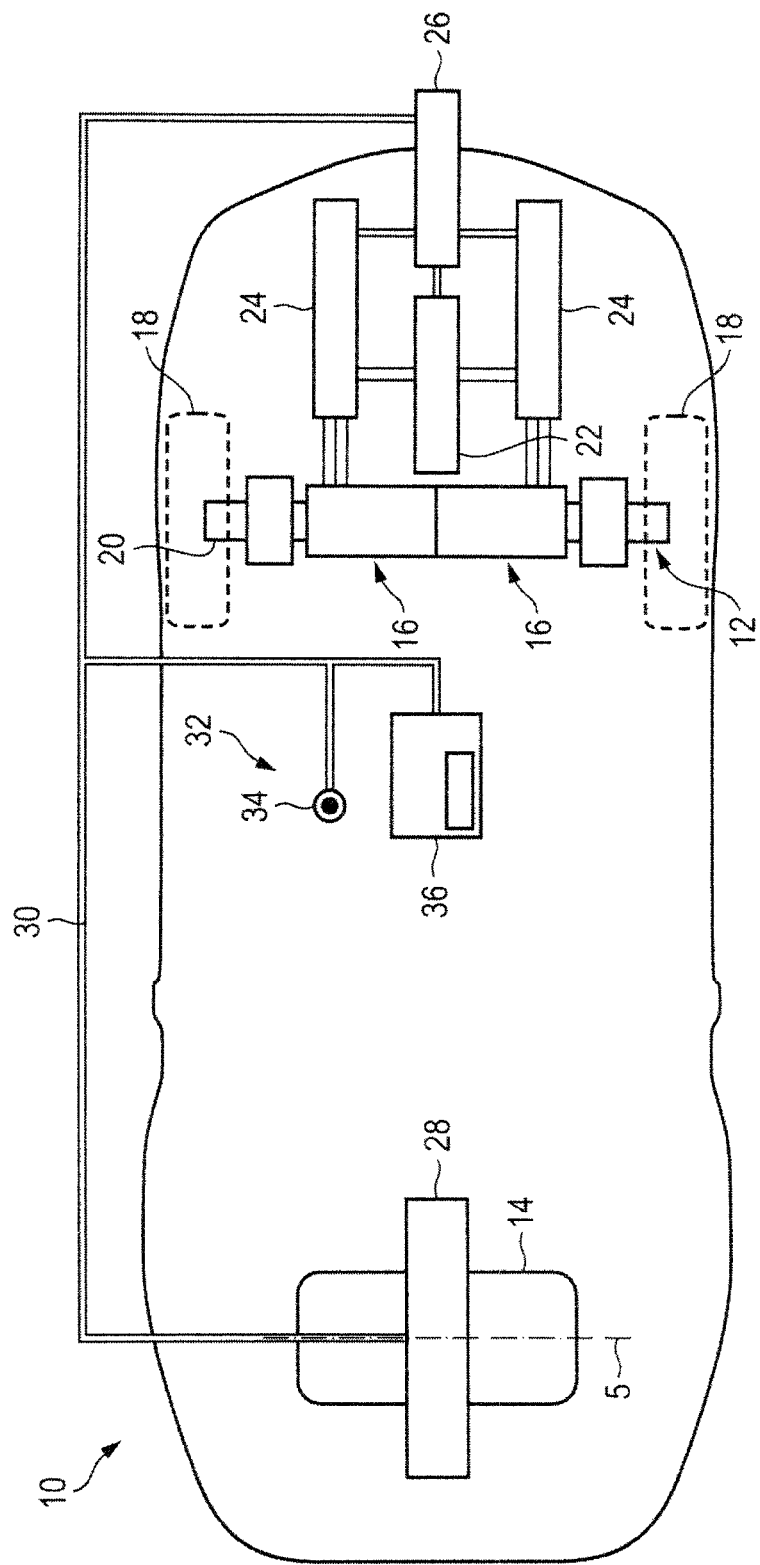
FIG. 1 is a plan view of a vehicle comprising a schematic representation of the coupled axle drive system in accordance with one embodiment of the invention.

FIG. 1 is a plan view of a vehicle 10 with a coupled axle drive system in accordance with one embodiment of the invention. The coupled axle drive system is shown in a purely schematic and greatly simplified way.

As shown in FIG. 1, the vehicle 10 has an engine 14, e.g. an internal combustion engine. In this embodiment, the engine 14 is in the rear area of the vehicle 10 and drives the two wheels (not shown) of the rear axle via a first conventional axle drive device 5. More particularly, the first axle drive device of the vehicle 10 implements a two-wheel drive. However, the vehicle 10 of the subject invention also can be switched to four-wheel drive or all-wheel drive as explained herein.

The coupled drive system of the invention also has a second, electric axle drive device 12 that drives at least one wheel of an axle or, in the present example, both wheels of the axle. In this example, the electric axle drive device 12 drives the front axle 20 of the vehicle 10 and has two electric machines 16, each of which drives a respectively associated wheel 18 of the front axle 20. The electric machines 16 are separated from one another or of independent construction and preferably drive the two wheels 18 independently of one another. However, it is also possible to provide just one electric machine device 16 that drives both wheels 18 of the axle 20.

The two separate electric machines 16 (e.g. electric motors) of the electric axle drive device 12 in the example of FIG. 1 drive the associated wheel 18 via a respective spur gear stage and a cardan shaft. An energy storage device 22 is provided, such as a battery, e.g. a high-voltage battery, or a flywheel storage device is provided to supply the electric machines 16 with energy or, in this case, electric energy. However, the invention is not restricted to these two examples of energy storage devices 22. Any other type of energy storage device 22 or any combination of energy storage devices 22 suitable for supplying the electric machine 16 with the necessary energy can be provided.

The energy storage device 22 also is connected to a converter 24. In this case, the converter 24 converts the direct current from the energy storage device 22 into an alternating current for the respective electric machine 16 so that the electric machine 16 can drive the associated wheel 18 of the electric axle 20 as required. The driving of the two wheels 18 can be controlled by an appropriate control device 26 or hybrid control device. Here, the control device 26 is connected to the energy storage device 22, the two converters 24 and the two electric machines 16. In this arrangement, the control device 26 can be coupled to an engine control device 28 or connected thereto via a bus system 30, e.g. a CAN bus system, as shown in FIG. 1, or alternatively can be part of the engine control device 28. The engine control device 28 controls the engine 14 and the first axle drive device 5 to drive the rear axle.

The control device 26 and/or the engine control device 28 also optionally can be connected to at least one input device 32, e.g. a boost button 34, and/or to a display device 36, as shown in FIG. 1. In this case, the driver of the vehicle 10 can input via the input device 32 that he wishes to operate the vehicle 10 in a predetermined operating mode, such as an operating mode suitable for four-wheel drive.

One operating mode of this kind is, for example, an acceleration mode and may be selected so that the driver can accelerate his vehicle 10 out of a bend. Selection of the acceleration mode via the input device 32 means that the vehicle 10 is driven by four-wheel drive via both axles instead of two-wheel drive via the rear axle. According to the invention, in four-wheel drive, the second axle, in this case the front axle 20 additionally can be driven by the electric drive device 12 to give a four-wheel drive. More specifically, the two front wheels 18 of the front axle 20 are driven by the two electric machines 16 of the electric drive device 12.

Another operating mode that is suitable for four-wheel drive is a slope mode, in which the driver wishes to drive his vehicle 10 up or down a hill with a corresponding gradient. The slope mode enables the vehicle 10 to be operated in four-wheel drive instead of two-wheel drive. However, the acceleration mode and the slope mode are just two examples among a large number of operating modes in which driving the vehicle 10 by four-wheel drive is particularly advantageous. The invention is not restricted to these examples of operating modes for four-wheel drive. A large number of operating modes that are suitable for operating the vehicle as a four-wheel drive can be provided.

The selected operating mode and/or a selection of suitable operating modes available to the driver may be displayed on the display device 36. The display device 36 also can be an input device, such as a touch screen for inputting or clicking on a desired operating mode in which the vehicle 10 can be operated in four-wheel drive.

As described above, the vehicle 10 can be operated in two-wheel drive or in four-wheel drive. In two-wheel drive, the rear wheels, for example, are operated by the engine 14, in this case the internal combustion engine, and, in four-wheel drive, the front wheels 18 also are operated by the associated electric machines 16. During this process, the electric machines 16 are supplied with energy from the energy storage device 22.

The energy storage device 22 is charged or supplied by way of the electric machines 16 of the electric axle 20, which are operated as generators. The charging of the energy storage device 22 by one or both of the electric machines 16 can be accomplished exclusively by the energy storage device 22 or can be supplied with energy by at least one further energy supply source, such as one of the few examples mentioned below.

The vehicle 10 optionally can have means to connect to a fixed power supply network (plug-in hybrid) as an alternative or in addition to the energy storage device 22. Thus, the electric machines 16 and/or the energy storage device 22 additionally may be supplied with energy by way of a socket of a fixed electrical connection. For this purpose, the socket may be connected or coupled to the energy storage device 22, the converter devices 24 and/or the electric machine devices 16.

The vehicle 10 also can have a generator, such as a high-voltage generator as an alternative or in addition to the energy storage device 22 and/or the fixed power supply network. The high-voltage generator is connected to the engine 14 and in the example of FIG. 1 is connected to the internal combustion engine 14 at the rear axle. In this arrangement, the high-voltage generator generates energy when it is driven by the engine 14. Moreover, the high-voltage generator can recover energy, for example from braking operations on the wheels of the rear wheel axle etc., which are driven by way of the engine 14. Thus, the high-voltage generator can supply the energy storage device, the electric machines 16 (directly) and/or the converter devices 24 (directly) with energy.

This vehicle having the electric axle drive device 12 of the invention can be operated as an electric all-wheel or four-wheel drive vehicle on an already known route, in particular on an already known race track, or a route determined using a navigation system. Four-wheel drive can be provided instead of the usual two-wheel drive when a time advantage through four-wheel driving compared with two-wheel driving of the vehicle 10, e.g. on the bends of the predetermined route is determined by a precalculation, such as a simulation calculation. Four-wheel drive then is achieved by motor-mode operation of the electric axle drive device 12 of the electric axle 20 on the bends of the route, enabling the route to be traveled in a shorter time. Here, a simulation calculation can be used to simulate the already known race track or, alternatively, the route determined by the navigation system (driver inputs the start and destination of a route into the navigation device and the navigation device determines the appropriate route) for two-wheel drive and four-wheel drive of the vehicle. It is then possible to determine, by means of a comparison, where four-wheel driving of the vehicle 10 would allow the route to be traveled more quickly. The vehicle 10 can then be operated there in four-wheel drive automatically or through input by the driver via an appropriate input device 32.

An additional check preferably is made beforehand such motor-mode operation of the electric axle drive device 12 to determine whether the energy storage device 22 can supply enough energy the electric machines 16 to drive the two wheels 18 in such motor-mode operation of the electric axle drive device 12. For this purpose, the charge condition of the energy storage device 22 may be checked to determine whether it is within a predetermined target range. If so, four-wheel drive of the vehicle 10 can be provided, in which the two axle wheels 18 are driven by the electric machines 16, for example on all bends on the predetermined or already known route, in such a way that the behavior of the vehicle 10 is the same on each bend, i.e. that the cornering speed is increased on each bend. The driver thus obtains uniform vehicle handling at all times on each bend. If the charge condition is not within the target range or if the energy storage device 22 is not sufficiently charged, four-wheel drive is not activated, and the vehicle 10 travels in two-wheel drive. The charge condition of any other energy sources that may be available for driving the electric machine devices 16 in addition to the energy storage device 22 can be checked and, if sufficient, four-wheel drive can be activated; otherwise, there must be a delay until the energy storage device 22 or some other additional energy source is charged sufficiently. For this purpose, a signal or signals can be generated by the engine control device 28 and/or the control device 26 to charge the energy storage device 22 or some other energy source to supply the electric machines 16 with energy.

Figure 2:
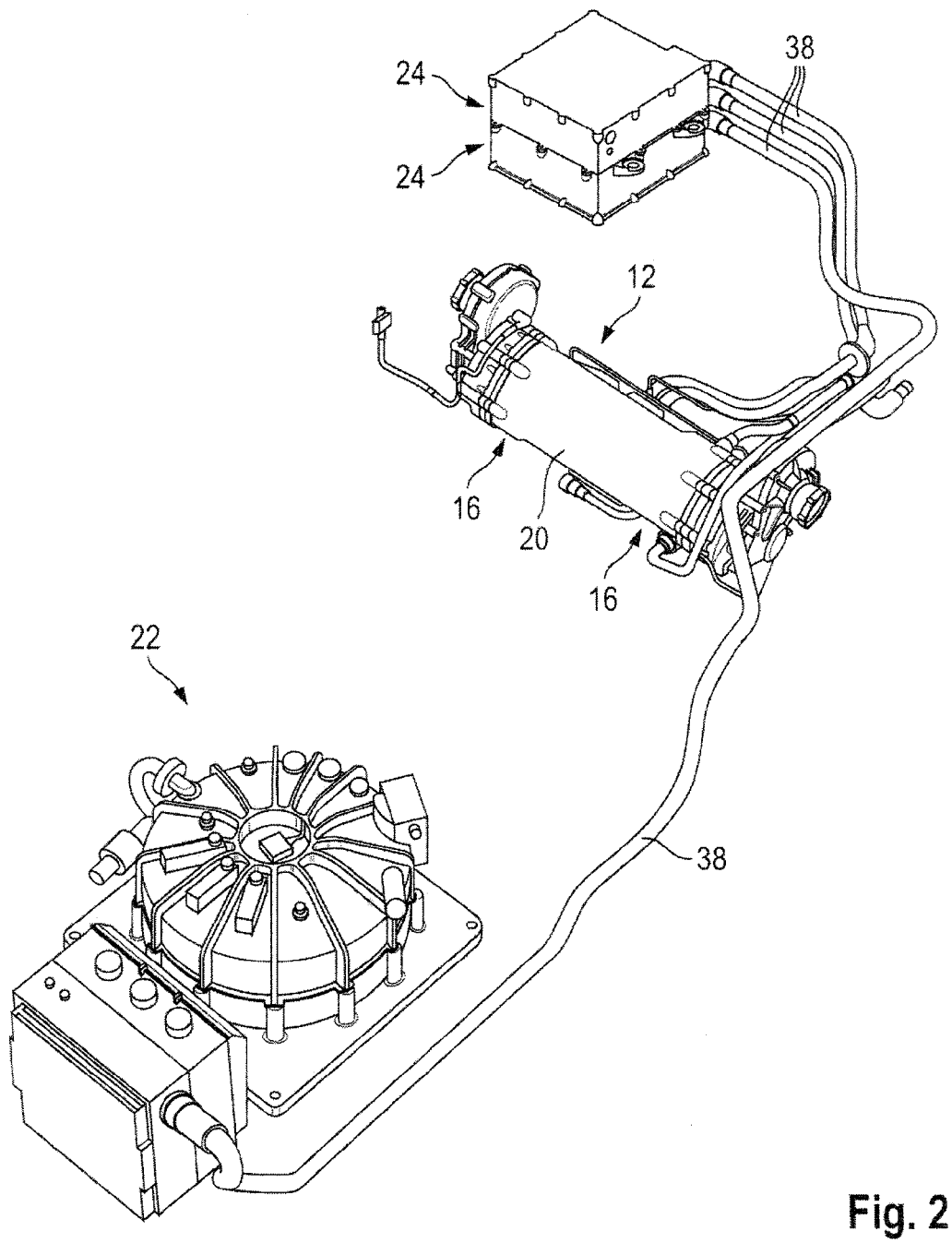
FIG. 2 is a perspective view of one example of the embodiment of the second, electric axle drive device in accordance with the invention.

FIG. 2 is a perspective view of an example of the electric axle drive device 12 of the coupled axle drive system of the invention. As described above, the electric axle drive device 12 has at least one electric machine, e.g. an electric motor, for driving at least one wheel of a vehicle axle 20. In the example in FIG. 2, two electric machines 16 are provided, one at each end of the axle 20, e.g. the rear axle or the front axle 20, to drive an associated wheel of the axle. The respective electric machine 16 is connected to an associated converter 24. Moreover, a further converter 24 is connected via a conductor 38 to an energy storage device 22, e.g. a flywheel storage device 22, as shown in FIG. 2.

A control device or a hybrid control device is provided for controlling the two electric machines 16. The control device is connected to both converters 24 via respective conductors and to the energy storage device 22 via a conductor as shown in FIG. 1. Moreover, the control device is connected to the engine control device via a bus system for example, e.g. a CAN bus system, as shown in FIG. 1.

Figure 3:
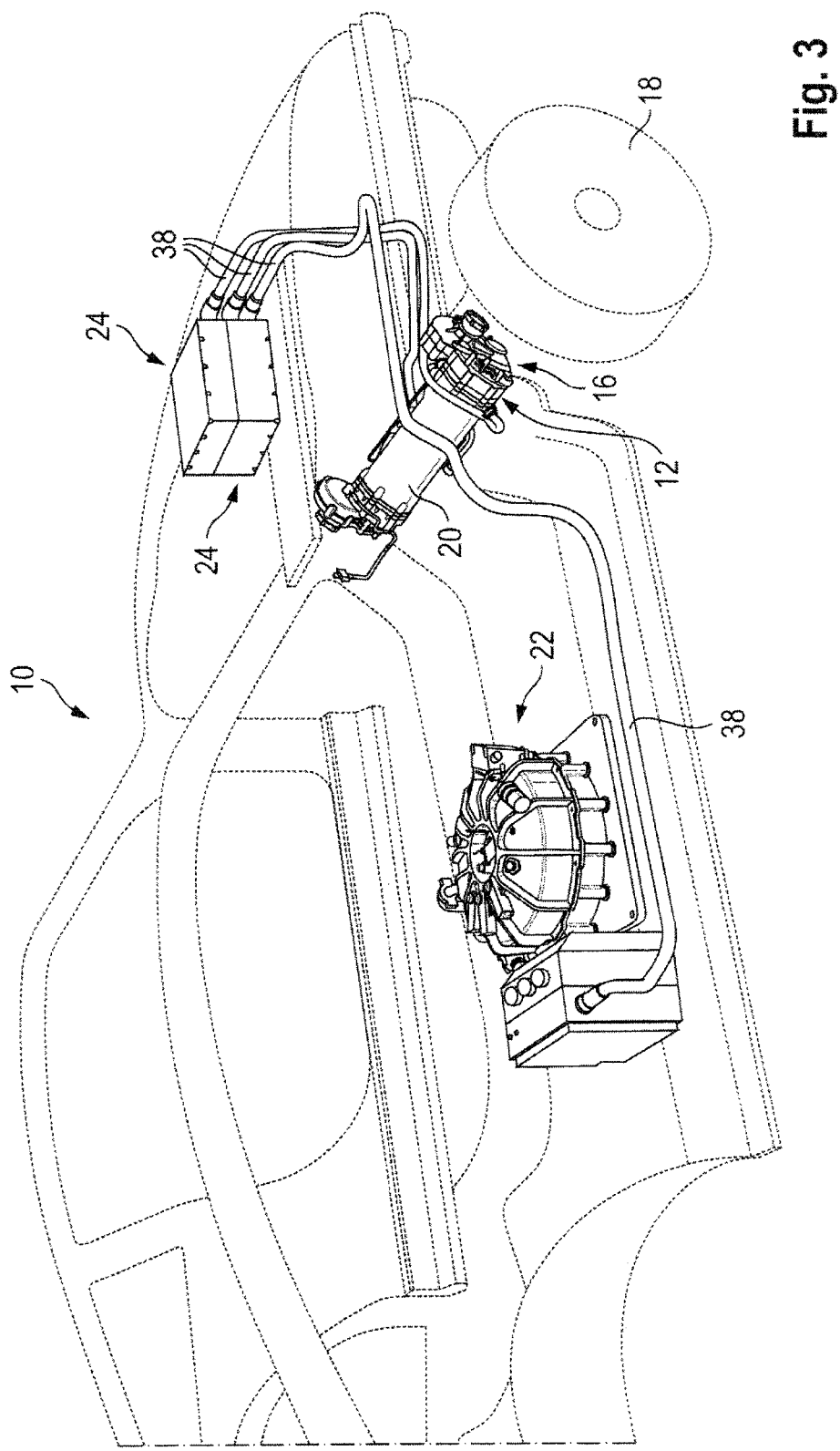
FIG. 3 is a perspective view of a vehicle shown as transparent with a fitted second, electric axle drive device in accordance with FIG. 2.

FIG. 3 shows one way of arranging the electric axle drive device 12 of FIG. 2 in a vehicle. The electric axle drive device 12 drives the wheels of the front axle 20 and therefore is connected to the front wheels 18. More precisely, the electric machines 16 are arranged at the front axle 20 and at the front wheels 18 thereof. The two converters 24 also are arranged at the front of the vehicle 10 in the vicinity of the electric machines 16 or the axle 20. However, it is also possible for the converters 24 to be at any other location in the vehicle 10 as long as they are connected or coupled to the electric machines 16 to provide the necessary energy. A flywheel storage device 22 is arranged in the center of the vehicle 10 or underneath the passenger compartment of the vehicle 10 in the example of FIG. 3. However, the energy storage device 22 can be arranged at any other location in the vehicle 10, for example at the front in the region of the front axle 20 or in the region of the rear or the rear axle of the vehicle 10. In this case, the energy storage device 22 is connected by a conductor 38 to the associated converter device 24, and the electric machines 26 are connected to the converters 24 by two corresponding conductors 38.

Figure 4:
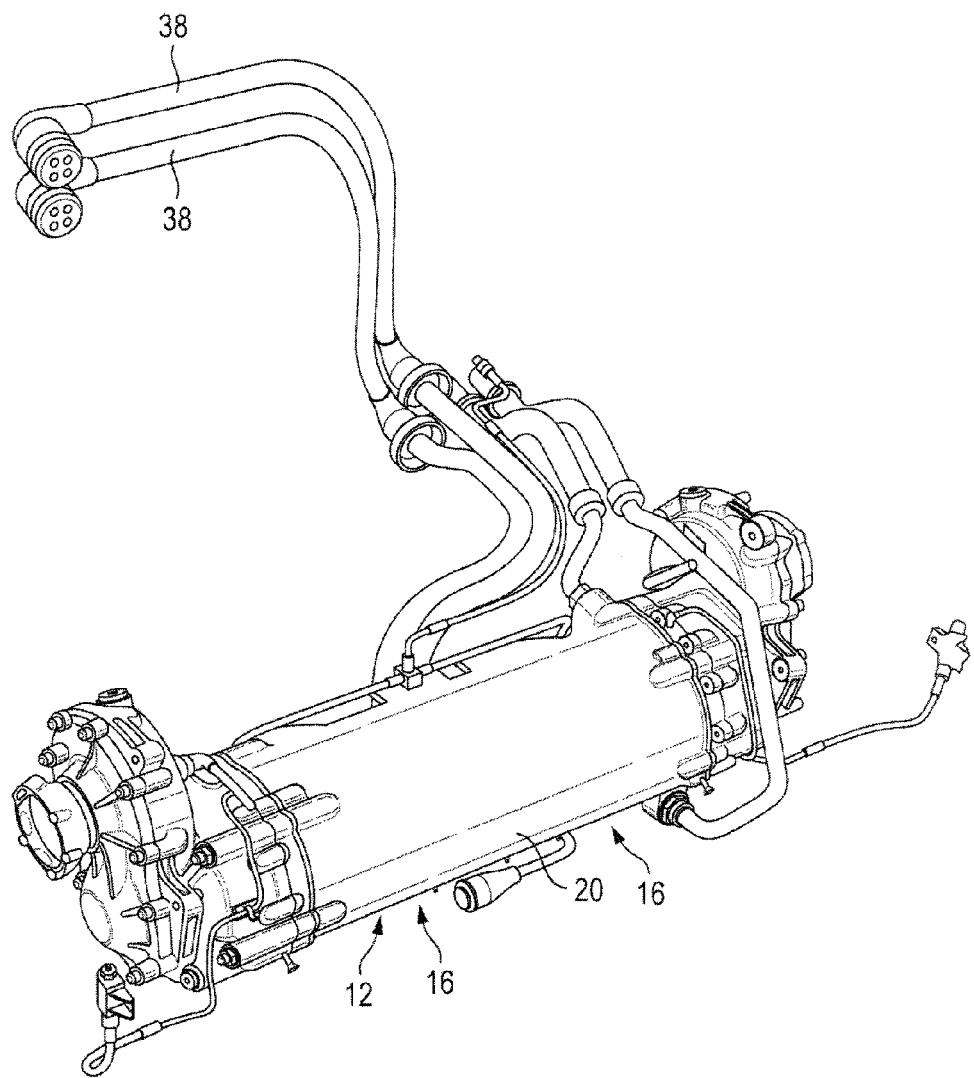
FIG. 4 is a perspective view of a portion of the second, electric axle drive device in accordance with FIGS. 2 and 3.

FIG. 4 shows part of the electric axle drive device 12 of the coupled axle drive system of the invention. As already described, the electric axle drive device 12 has the axle 20 with the two electric machines 16, for driving the two wheels of the axle 20, and the associated converters 24. Two conductors 38 connect the electric machines 16 to the two converters 24. In this case, the two converters 24 are arranged in a housing, as shown in FIG. 6 below.

Figure 5:
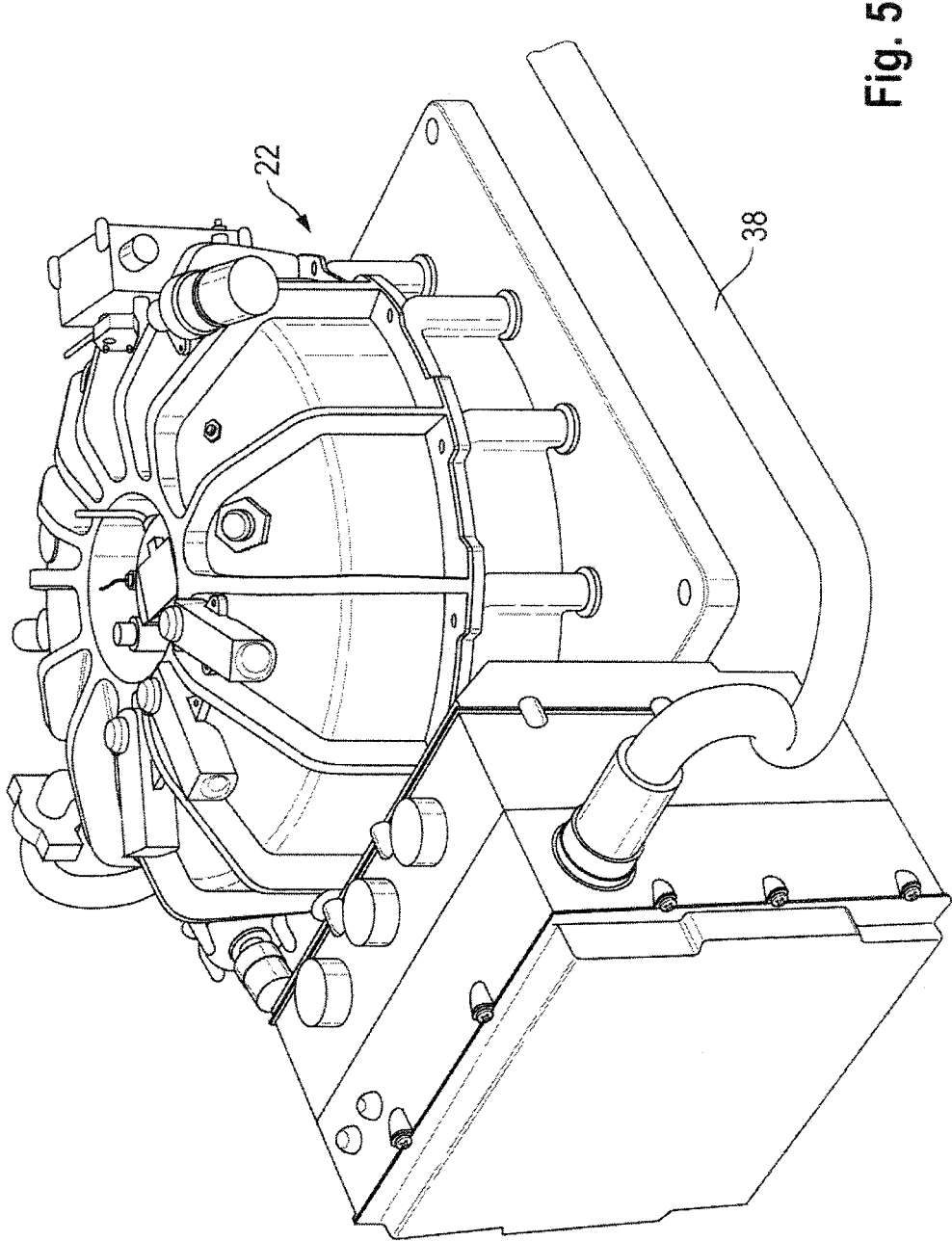
FIG. 5 shows a portion of the energy storage device of the second, electric axle drive device in accordance with FIGS. 2 and 3.

FIG. 5 shows the energy storage device 22. The energy storage device 22 in this example is a flywheel storage device 22 that is connected to the two electric machines and to a converter by a conductor 38 to supply the electric machines with energy. Moreover, the flywheel storage device 22 is connected by a conductor to the control device or hybrid control device (not shown).

Figure 6:
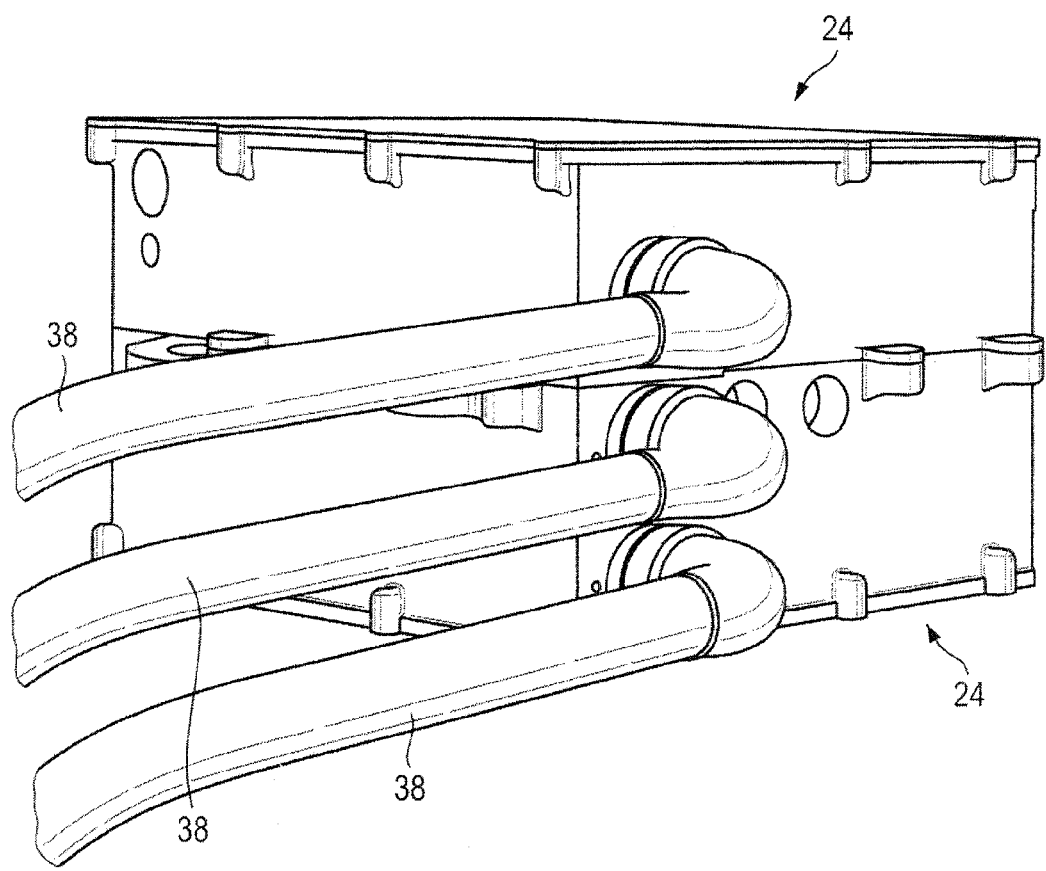
FIG. 6 shows a portion of the control device for the axle drive system according to the invention in accordance with FIGS. 2 and 3.

FIG. 6 shows the converters 24 connected to the two electric machines by conductors 38, with one converter being connected to the energy storage device by a further conductor 38.

Although the invention has been described by the preferred illustrative embodiments, it is not limited thereto but can be modified in many different ways.

In particular, it is also possible for the various embodiments to be combined, individual special features thereof.

The electric axle drive device can be provided for a rear axle or a front axle of a vehicle. One or both wheels of the axle can be driven by means of the electric drive device when required. Moreover, a dedicated electric machine, e.g. an electric motor, and a converter device can be provided for each of the wheels, allowing each wheel to be driven independently of the other. However, it is also possible for just one electric motor and a corresponding associated converter to be provided for driving both wheels of an axle. Moreover, it is also possible for each of the two electric machines for driving the two wheels of the axle to have a dedicated energy storage device, e.g. a battery and/or a flywheel storage device etc. instead of at least one common energy storage device.

According to the invention, the axle can be part of the electric drive device, as shown, for example in FIGS. 2, 3 and 4, and can be installed as such in a vehicle. However, it is also possible for the axle not to be part of the electric drive device and, instead, for the respective electric machine device, the converter and the energy storage device, for example, to be retrofitted to a vehicle and to the axle thereof.

What is claimed is:

1. A coupled axle drive system for a vehicle, comprising:
   a first axle drive device for driving a first axle of the vehicle by a connected engine;
   a second axle drive device for driving a second axle of the vehicle, the second axle drive device having at least one electric machine for driving wheels of the second axle
   at least one energy storage device connected to the electric machine;
   a control device connected to the second axle drive device and to an engine control device or being part of the engine control device, the controller including a route simulator for determining which sections of a specified route should be driven by both the first and second drive devices to achieve quickest traversal of the route and applying power by the second axle drive device based on the determined charge state of the energy store to achieve uniform handling of the vehicle in each of the sections of the route in which the second drive device is actuated.

2. The coupled axle drive system of claim 1, wherein the at least one electric machine comprises two electric machines and wherein the wheels are driven respectively by the electric machines.

3. The coupled axle drive system of claim 1, wherein the energy storage device is a battery device or a flywheel storage device.

4. The coupled axle drive system of claim 1, wherein the second axle drive device further has a converter between the electric machine and the energy storage device to supply the electric machine with energy from the energy storage device.

5. The coupled axle drive system of claim 1, wherein the electric machine is operable as a generator for charging the energy storage device.

6. The coupled axle drive system of claim 1, wherein the energy storage device is configured for connection to a fixed power supply network.

7. The coupled axle drive system of claim 1, wherein the energy storage device is connected to a generator device.

8. The coupled axle drive system as claimed in claim 1, wherein at least one of the control device and the engine control device are connected to at least one input device or a display device.

9. A vehicle having the coupled axle drive system of claim 1.

10. A method for controlling a coupled axle drive system having a first axle drive device for driving a first axle of a vehicle by an engine and a second axle drive device for driving a second axle of the vehicle, the second axle drive device having at least one electric machine for driving wheels of the second axle and an energy store connected to the electric machine, the method being performed by a control device and comprising:
   determining a route for the vehicle;
   simulating the vehicle being driven on the route by two-wheel drive and separately by four-wheel drive;
   comparing the simulation for two-wheel drive and four-wheel drive;
   determining, based on the simulation, which sections of the route should be driven by four wheel drive to achieve a quickest traversal of the route;
   determining a charge condition of the energy store; and
   actuating the second axle drive device to achieve four wheel drive in the route sections that were determined in the simulation to achieve the quickest traversal of the route with the four-wheel drive, and the second axle drive device being actuated based on the determined charge state of the energy store to achieve uniform handling of the vehicle in each of the sections of the route in which the second drive device is actuated.

11. The method of claim 10, further comprising:
actuating the second axle drive device if the charge condition of the energy store is within a predetermined target range.

12. The method of claim 10, further comprising determining the route by means of a navigation system or on the basis of an already known route.

13. The method of claim 10, wherein the route has a plurality of bends that define the sections of the route, the step of actuating the second axle drive device to achieve four wheel drive is carried out to increase cornering speed uniformly on each of the bends.

14. The method of claim 10, wherein the route has a plurality of slopes that define the sections of the route, the step of actuating the second axle drive device to achieve four wheel drive is carried out to achieve uniform handling on each of the slopes.

15. A method for controlling a coupled axle drive system having a first axle drive device for driving a first axle of a vehicle by an engine and a second axle drive device for driving a second axle of the vehicle, the second axle drive device having at least one electric machine for driving at least one wheel of the second axle and an energy store connected to the electric machine, the method comprising:
traveling a route with the vehicle while using the first drive device;
determining, by a control device and on the basis of the route, whether there is a suitable route section suitable for four-wheel drive by simulating the vehicle being driven on the route by two-wheel drive and then by four-wheel drive;
comparing by the control device the simulation for two-wheel drive and four-wheel drive;
determining by the control device a route section suitable for four-wheel drive as the route section through which the vehicle travels more quickly in the simulation with four-wheel drive than with two-wheel drive; and
actuating the second axle drive device if there is at least one such route section.

* * * * *